United States Patent
Kobayashi et al.

(10) Patent No.: US 11,126,491 B2
(45) Date of Patent: Sep. 21, 2021

(54) INFORMATION PROCESSING APPARATUS AND CONTROL METHOD INCLUDING A MECHANISM FOR IDENTIFYING A CAUSE OF AN ERROR IN THE INFORMATION PROCESSING APPARATUS

(71) Applicant: CANON KABUSHIKI KAISHA, Tokyo (JP)

(72) Inventors: Norihiko Kobayashi, Fujisawa (JP); Kimito Kasahara, Tokyo (JP); Kaori Nishiyama, Toride (JP); Naoto Watanabe, Abiko (JP); Keisuke Aizono, Matsudo (JP); Satoshi Seki, Tokyo (JP); Masahiro Mutsuno, Tokyo (JP); Takuma Yasukawa, Kashiwa (JP); Yuki Suetani, Tokyo (JP); Toshiyuki Miyake, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 217 days.

(21) Appl. No.: 16/374,548

(22) Filed: Apr. 3, 2019

(65) Prior Publication Data
US 2019/0324833 A1    Oct. 24, 2019

(30) Foreign Application Priority Data
Apr. 18, 2018    (JP) .............................. JP2018-080120

(51) Int. Cl.
*G06F 11/07*    (2006.01)
*G06F 3/12*    (2006.01)

(52) U.S. Cl.
CPC .......... *G06F 11/079* (2013.01); *G06F 3/1293* (2013.01); *G06F 11/0736* (2013.01);
(Continued)

(58) Field of Classification Search
CPC .. G06F 11/079; G06F 3/1293; G06F 11/0736; G06F 11/0751; G06F 11/0769; G06F 11/0793
See application file for complete search history.

(56) References Cited

U.S. PATENT DOCUMENTS

2004/0181712 A1*    9/2004    Taniguchi ............. G06F 11/079
                                                                  714/47.2
2008/0126860 A1*    5/2008    Sampath ............ H04N 1/00413
                                                                  714/25
(Continued)

FOREIGN PATENT DOCUMENTS

CN    104276086 A    1/2015
CN    105842554 A    8/2016
(Continued)

*Primary Examiner* — Matthew M Kim
*Assistant Examiner* — Indranil Chowdhury
(74) *Attorney, Agent, or Firm* — Canon U.S.A., Inc. I.P. Division

(57) ABSTRACT

An information processing apparatus includes sensors for detecting a plurality of types of errors. The information processing apparatus identifies a type of an error detected by one of the sensors, acquires a result of diagnostic processing corresponding to the identified type of the error, and outputs error information indicating the identified type of the error, and diagnostic information about a component corresponding to the result of the diagnostic processing.

12 Claims, 10 Drawing Sheets

(52) U.S. Cl.
 CPC ...... *G06F 11/0751* (2013.01); *G06F 11/0769*
   (2013.01); *G06F 11/0793* (2013.01)

(56) References Cited

U.S. PATENT DOCUMENTS

| | | | | |
|---|---|---|---|---|
| 2008/0174802 A1* | 7/2008 | Sampath | ............ | G06F 11/0748 |
| | | | | 358/1.13 |
| 2008/0240827 A1* | 10/2008 | Yamazaki | ............ | G06F 3/1207 |
| | | | | 400/73 |
| 2008/0294423 A1* | 11/2008 | Castellani | ........... | G06F 11/0793 |
| | | | | 704/4 |
| 2011/0002000 A1* | 1/2011 | Tomaru | ................ | G06F 11/079 |
| | | | | 358/1.14 |
| 2020/0310934 A1* | 10/2020 | Shibata | ............... | G06F 11/2257 |

FOREIGN PATENT DOCUMENTS

| | | | |
|---|---|---|---|
| CN | 106802835 A | * | 6/2017 |
| CN | 106951465 A | | 7/2017 |
| CN | 107924355 A | | 4/2018 |
| JP | H06162218 A | | 6/1994 |
| JP | 2017-017611 A | | 1/2017 |

\* cited by examiner

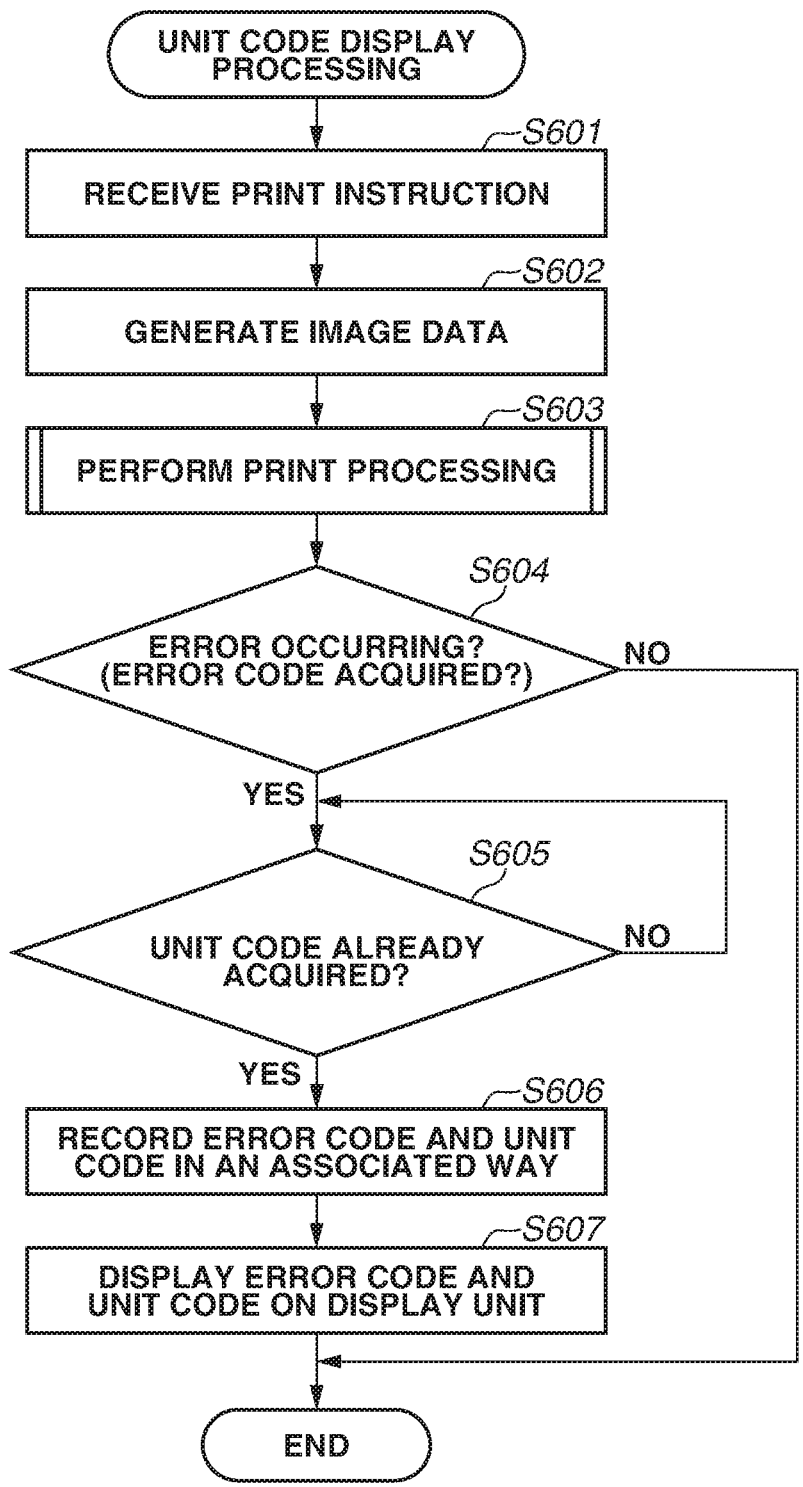

ERROR OCCURRED
EXXXXXX-YYYY 0005-0-0001-0-05

ERROR OCCURRED
EXXXXXX-YYYY

ERROR OCCURRED
EXXXXXX-YYYY

FAILED UNIT COULD NOT BE
IDENTIFIED AS A RESULT OF
FAILURE DIAGNOSTIC PROCESSING

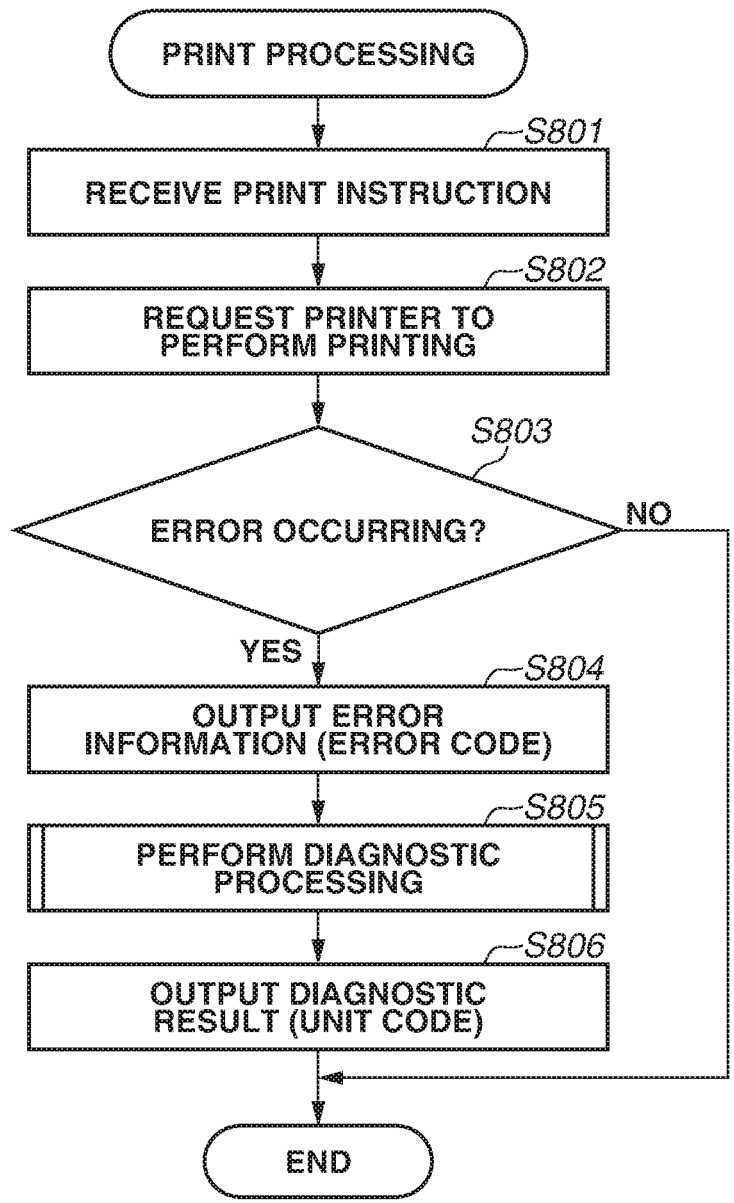

INFORMATION PROCESSING APPARATUS AND CONTROL METHOD INCLUDING A MECHANISM FOR IDENTIFYING A CAUSE OF AN ERROR IN THE INFORMATION PROCESSING APPARATUS

BACKGROUND

Field of the Invention

The present disclosure relates to an information processing apparatus which includes mechanisms for identifying the cause of an error that has occurred in the information processing apparatus.

Description of the Related Art

In recent years, with the increase in the complexity of information processing apparatuses including multifunction peripherals, diverse types of hardware and software components have been mounted by information processing apparatuses to implement functions.

If a problem occurs in a certain component, an error code corresponding to the error that has occurred is displayed. This error code enables a service engineer (for example, a maintenance service provider) or a user to identify a solution corresponding to the error code and take measures to resolve the error.

Japanese Patent Application Laid-Open No. 6-162218 discusses a technique in which a service engineer inputs a model code and a failure code of a photographic processing apparatus to be repaired to a failure diagnosis apparatus such as a handy terminal. A system discussed in Japanese Patent Application Laid-Open No. 6-162218 reads and displays candidate solutions corresponding to the input failure code from a failure management map stored in a memory card attached to the failure diagnosis apparatus.

Japanese Patent Application Laid-Open No. 2017-17611 discusses an information processing apparatus for identifying, upon reception of a failure notification from a multifunction peripheral, the cause of the failure based on condition information acquired from the multifunction peripheral and a predetermined failure cause diagnostic model. In connection with a failure cause diagnosis process for identifying the cause of the failure, the information processing apparatus outputs measures and components required for resolving the failure so that a customer engineer can confirm the measures and needed components.

In the conventional techniques discussed in Japanese Patent Application Laid-Open No. 6-162218 and Japanese Patent Application Laid-Open No. 2017-17611, an information processing apparatus different from the defective apparatus identifies candidate causes of the failure based on prestored failure-to-cause correspondence information. In the conventional techniques, there are some cases where the actual cause of a failure cannot be identified until a service engineer performs diagnostic processing on the defective apparatus directly.

For example, in the technique discussed in Japanese Patent Application Laid-Open No. 6-162218, the handy terminal identifies a solution for a failure based on the model code and the failure code of the apparatus to be repaired. However, even in a case where the same single failure code is output, the cause of the failure may be a disconnection failure or a communication breakdown due to a software error (without disconnection). Therefore, the actual cause of the failure may not be identified until a service engineer performs a continuity test and a communication test on the apparatus to be repaired.

Likewise, in a system discussed in Japanese Patent Application Laid-Open No. 2017-17611, the actual cause of a failure may not be identified until a service engineer performs a continuity test and a communication test on the apparatus to be repaired because an information processing apparatus different from the apparatus to be repaired identifies the cause of the failure.

SUMMARY

In various embodiments of the present disclosure, an information processing apparatus is provided which includes sensors for detecting a plurality of types of errors, at least one memory for storing instructions, and at least one processor for executing the instructions. The instructions, when executed by the at least one processor, causing the information processing apparatus to identify a type of an error detected by one of the sensors, acquire a result of diagnostic processing corresponding to the identified type of the error, and control output of error information indicating the identified type of the error, and diagnostic information about a component corresponding to the result of the diagnostic processing.

Further features of the present disclosure will become apparent from the following description of exemplary embodiments with reference to the attached drawings.

BRIEF DESCRIPTION OF THE DRAWINGS

FIG. 6 is a flowchart illustrating processing for displaying a unit code according to the first exemplary embodiment.

FIG. 8 is a flowchart illustrating print processing according to the first exemplary embodiment.

DESCRIPTION OF THE EMBODIMENTS

<System Configuration>

Figure 1:
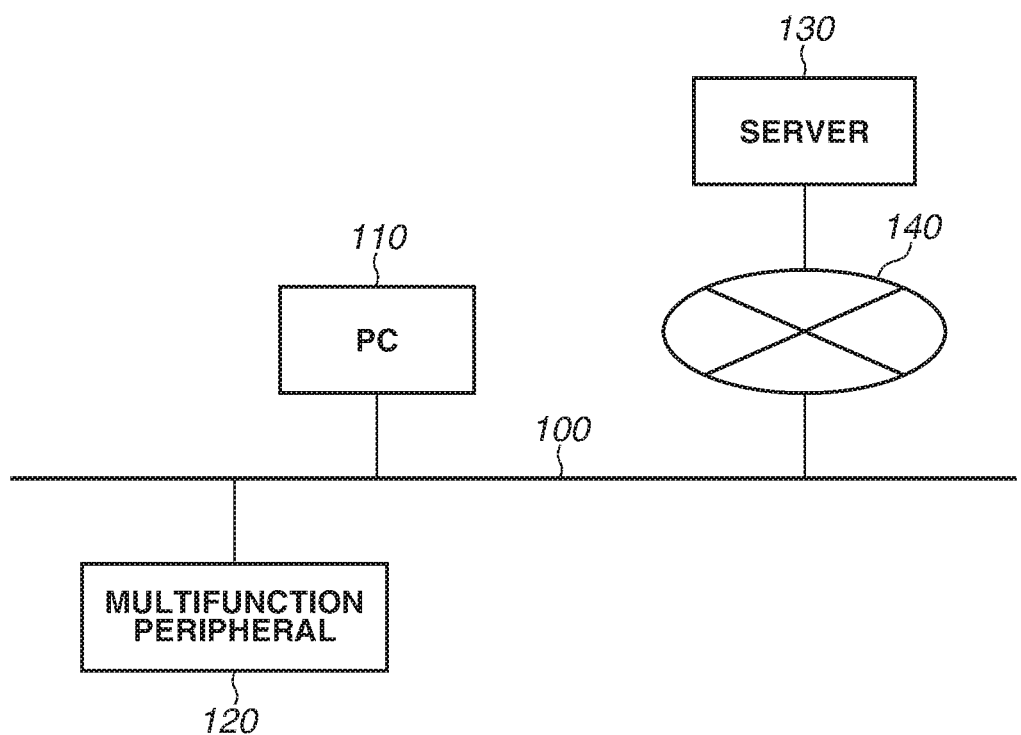
FIG. 1 illustrates a system configuration according to a first exemplary embodiment.

A first exemplary embodiment will be described below. A system configuration according to the present exemplary embodiment will be described below with reference to FIG. 1. A personal computer (PC) 110 and a multifunction peripheral 120 are connected to a local area network (LAN) 100. According to the present exemplary embodiment, the multifunction peripheral 120 is capable of communicating with a server 130 via a network 140. Although, in the example illustrated in FIG. 1, the multifunction peripheral 120 is connected to the network 140 via the LAN 100, the configuration is not limited thereto. For example, the multifunction peripheral 120 may be directly connected to the network 140 to communicate with the PC 110 and the server 130 in a wired or wireless communication connection form.

The PC 110 transmits a print instruction to the multifunction peripheral 120 via the LAN 100. Instead of the PC 110, an information processing apparatus, such as a portable terminal, may transmit the print instruction. The multifunction peripheral 120 is an apparatus for implementing a plurality of functions, such as a copy function and a FAX function. The multifunction peripheral 120 is also provided with a function of internally storing a history of execution of these functions and a function of storing the occurrences of errors and alerts. Although the present exemplary embodiment will be described below centering on the multifunction peripheral 120 as an example, a single function printer (SFP) may be used instead of the multifunction peripheral 120. Alternatively, an information processing apparatus other than an image forming apparatus (a multifunction peripheral or an SFP) may be used.

The multifunction peripheral 120 displays an error code indicating the type of an error that has occurred, and a unit code as diagnostic information indicating a result of diagnosis by the multifunction peripheral 120. The unit code is information indicating the cause of the error occurring in the multifunction peripheral 120 and the unit in which the error has occurred.

The multifunction peripheral 120 further transmits the error code and the unit code to the server 130. The server 130 can be accessed, for example, from the service center to which a service engineer belongs. The multifunction peripheral 120 transmits the operation history of its own to the server 130 in a periodical way or when a predetermined event has occurred. By accessing the server 130, the service engineer can confirm the type of the error occurring in the multifunction peripheral 120, the unit in which the error has occurred, and the cause of the error.

Alternatively, the server 130 may be prepared by the administrator of the multifunction peripheral 120 and connected to the LAN 100 to which the multifunction peripheral 120 is connected.

<Hardware Configuration of Multifunction Peripheral 120>

Figure 2:
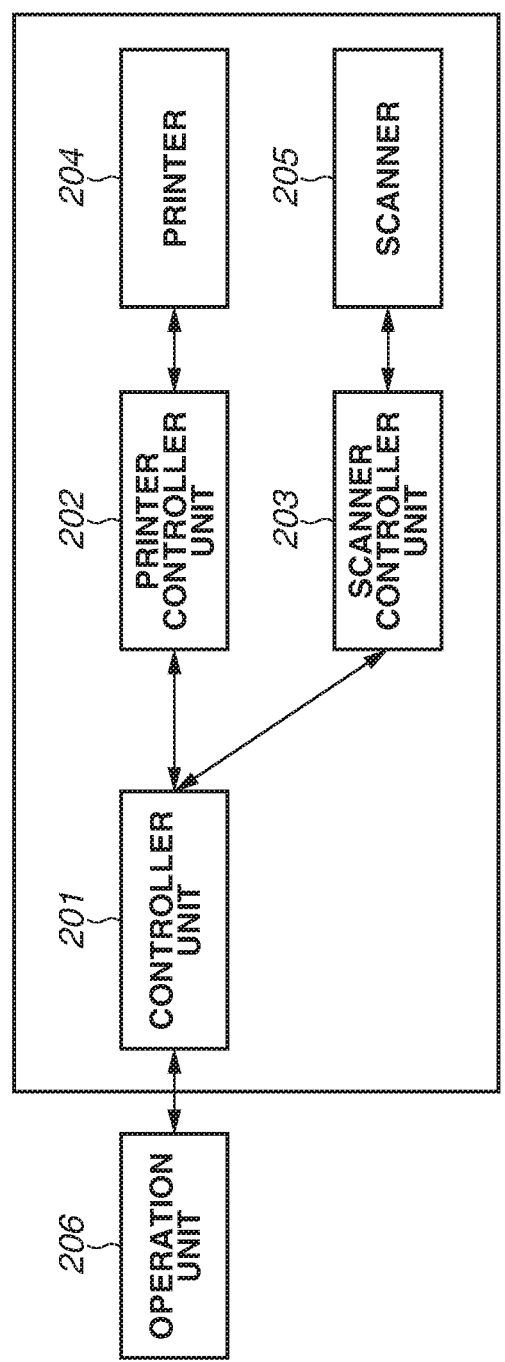
FIG. 2 illustrates a hardware configuration of a multifunction peripheral according to one embodiment.

A configuration of the multifunction peripheral 120 according to the present exemplary embodiment will be described below with reference to FIG. 2. A controller unit 201 is a controller for generally managing information processing control related to operations of the multifunction peripheral 120. The controller unit 201 controls an operation unit 206, a printer controller unit 202, and a scanner controller unit 203.

The printer controller unit 202 controls a printer 204 as an image output device. The printer controller unit 202 and the printer 204 constitute a print processing unit for performing print processing. The scanner controller unit 203 controls a scanner 205 as an image input device. The scanner controller unit 203 and the scanner 205 constitute a read processing unit for performing image read processing.

Figure 3:
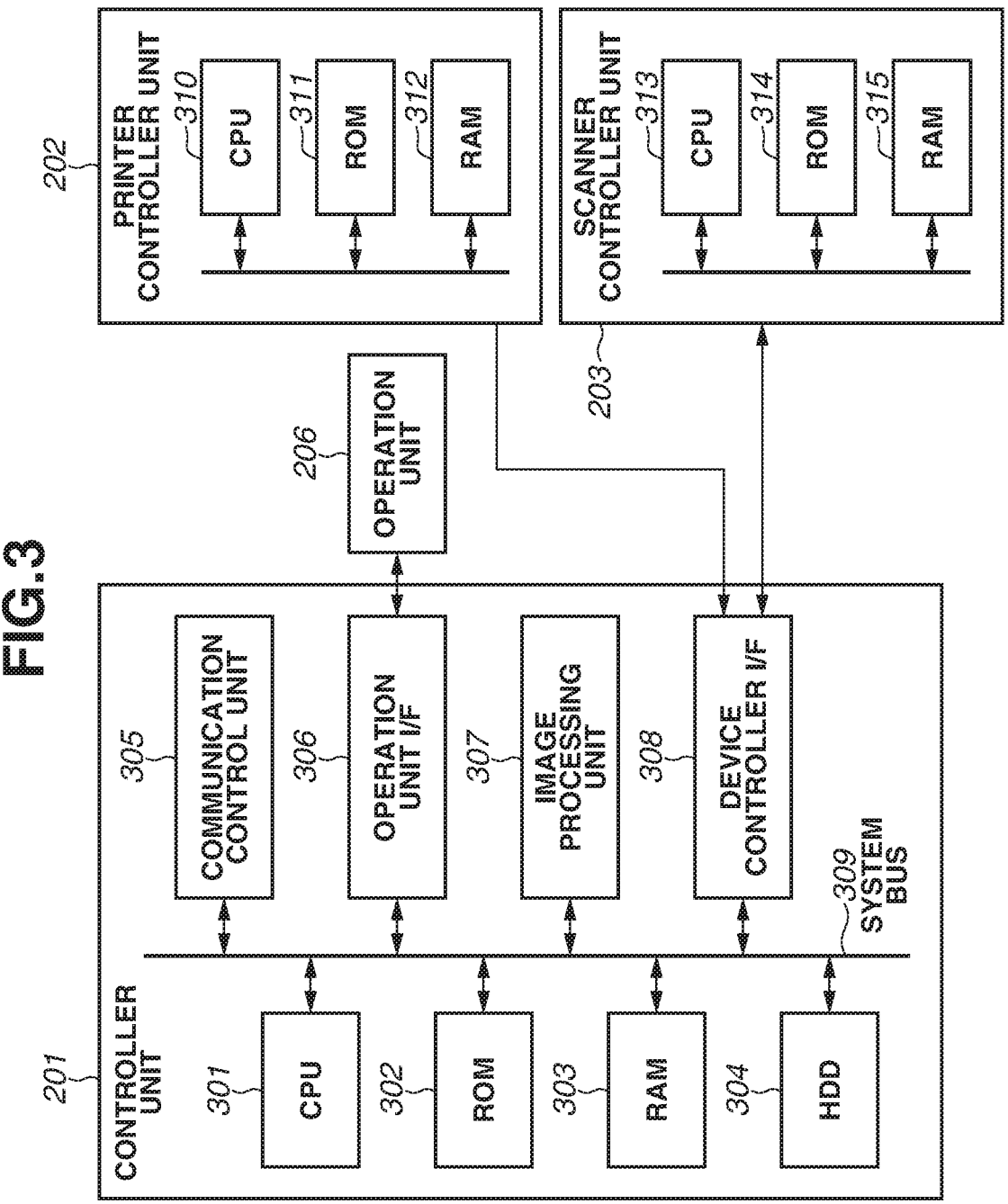
FIG. 3 illustrates a hardware configuration of each controller unit according to one embodiment.

Hardware configurations of the controller unit 201 and the printer controller unit 202 of the multifunction peripheral 120 will be described below with reference to FIG. 3.

The controller unit 201 includes a central processing unit (CPU) 301 which activates an operating system (OS) by using a boot program stored in a read only memory (ROM) 302. The controller unit 201 may include not only the CPU 301 but also a plurality of processors.

The ROM 302 stores a control program to be executed by the CPU 301. The ROM 302 includes, for example, a flash memory, such as an embedded MultiMedia Card (eMMC) and its controller.

On the OS, the CPU 301 executes application programs stored in the ROM 302 or a hard disk drive (HDD) 304 to implement various processing. A random access memory (RAM) 303 is used as a work area of the CPU 301. The RAM 303 offers a work area and also offers an image memory area for temporarily storing image data. The ROM 302 or the HDD 304 stores the above-described application programs, image data, and various setting values. Since the HDD 304 is not an essential configuration, the multifunction peripheral 120 may not include the HDD 304.

An operation unit interface (I/F) 306 is an interface between the CPU 301 and the operation unit 206 having a touch panel. The operation unit I/F 306 outputs, to the operation unit 206, image data to be displayed on the operation unit 206. Although, in the present exemplary embodiment (described below), the operation unit 206 also serves as a display unit, the operation unit 206 and the display unit may be configured as different units. The operation unit I/F 306 sends to the CPU 301 information input by the user via the operation unit 206.

A device controller I/F 308 is an interface between the CPU 301 and the scanner controller unit 203 and between the CPU 301 and the printer controller unit 202.

A communication control unit 305 connected to the LAN 100 controls communication with each apparatus on the LAN 100 and each apparatus on the network 140 via the LAN 100.

An image processing unit 307 performs processing for outputting an image to the printer 204, processing for inputting an image from the scanner 205, image rotation, image compression, resolution conversion, color space conversion, and gradation conversion.

The printer controller unit 202 is connected with the printer 204 having an electrophotographic printer engine. A CPU 310 controls the printer 204 to perform printing. Under the control of the CPU 310, the printer 204 prints image data received from the controller unit 201 by the printer controller unit 202. The CPU 310 executes the program stored in a ROM 311 and uses a RAM 312 as a work memory to control the printer 204.

The scanner controller unit 203 is connected with the scanner 205 for optically reading an image to generate image data. A CPU 313 controls the scanner 205 to acquire image data and inputs the image data to the controller unit 201 via the device controller I/F 308.

<Firmware Configuration>

Figure 4:
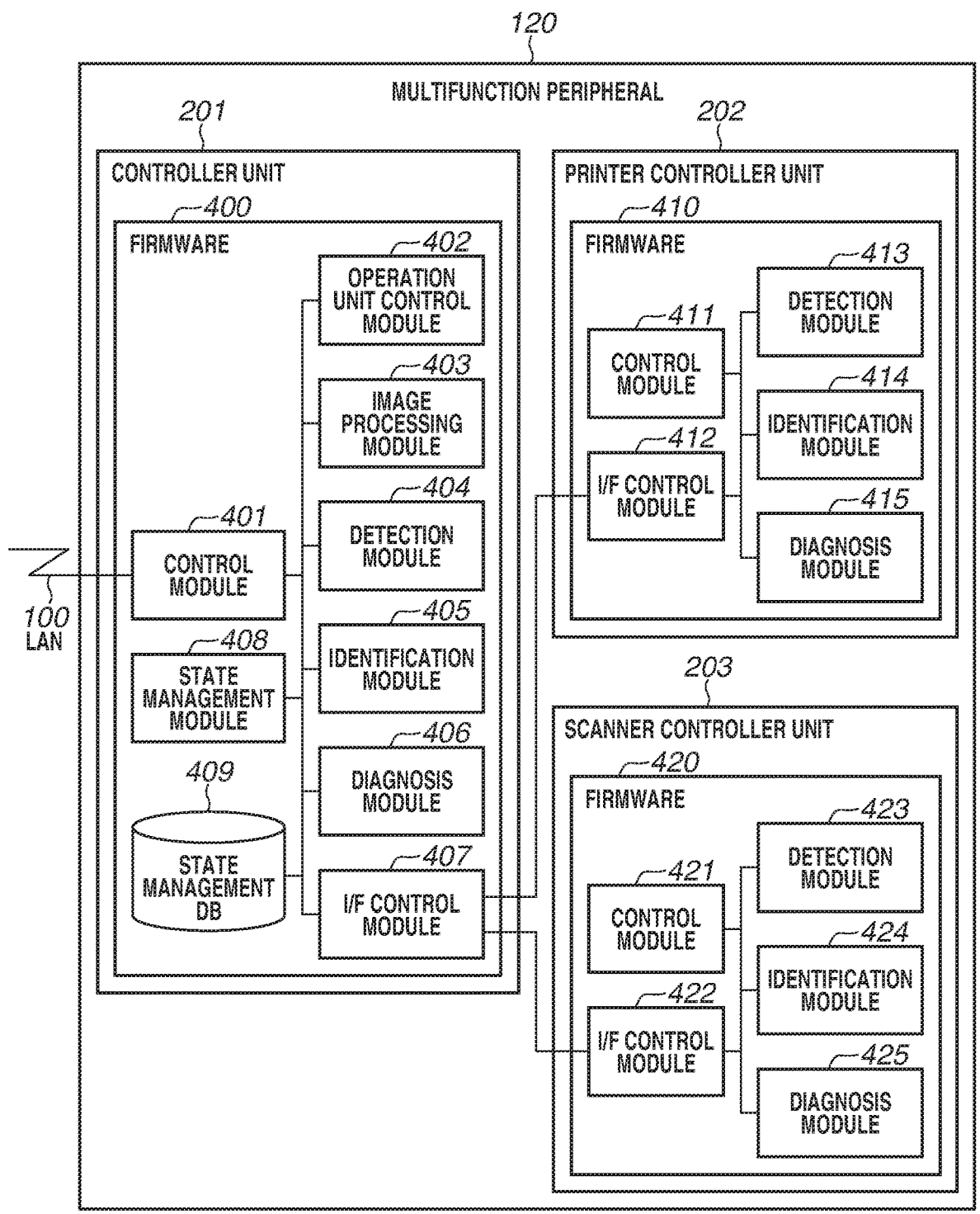
FIG. 4 illustrates a software configuration of each controller unit according to one embodiment.

A software configuration of firmware 400, firmware 410, and firmware 420 operating on the multifunction peripheral 120 according to the present exemplary embodiment will be described below with reference to FIG. 4.

The firmware 400 generally controls each configuration of the multifunction peripheral 120. The firmware 400 is stored in at least one of the ROM 302, the RAM 303, and the HDD 304 and is executed by the CPU 301.

The firmware 410 operates the printer controller unit 202. The firmware 410 is stored in at least one of the ROM 311 and the RAM 312 and is executed by the CPU 310.

The firmware 420 operates the scanner controller unit 203. The firmware 420 is stored in at least one of a ROM 314 and a RAM 315 and is executed by the CPU 313.

<Configuration of Firmware 400>

First of all, a configuration of the firmware 400 will be described below. When a control module 401 receives a print instruction via the communication control unit 305, the control module 401 requests an image processing module 403 to generate image data. The image processing module 403 generates image data according to the received print instruction. This image data conforms to a data format with which the printer 204 can perform print processing. The control module 401 performs control to transmit the generated image data to the printer controller unit 202 via an I/F control module 407.

When the control module 401 receives a scan execution instruction from an operation unit control module 402, the control module 401 instructs the scanner controller unit 203 to perform scan processing (image read processing) via the I/F control module 407.

The control module 401 acquires, via the I/F control module 407, the scan data received from the scanner controller unit 203.

In response to inquiries from other modules, the control module 401 can return job-related data, receive an event subscription request, and transmit an event at the timing of a job state transition. For example, the control module 401 can transmit an event at the timing of the start, suspend, or end of a job.

The operation unit control module 402 receives a user operation as an instruction for executing a copy or scan job from the operation unit 206 via the operation unit I/F 306 and notifies the control module 401 of the user operation.

The I/F control module 407 receives processing target image data and control content from the control module 401 and notifies the printer controller unit 202 and the scanner controller unit 203 of the received control content. The I/F control module 407 receives use information, sensor values, and error information for components included in the printer 204 and the scanner 205 from the printer controller unit 202 and the scanner controller unit 203, respectively.

A state management module 408 manages the state of the multifunction peripheral 120. For example, the state management module 408 has a role of managing the error code and alarm code notified to the controller unit 201 from the printer 204 and the scanner 205 connected to the multifunction peripheral 120.

The error code is identification information indicating the type of an error occurring in the multifunction peripheral 120. The error code is notified as a string of characters and numbers, such as E000000-1111.

For example, if the temperature of a fixing unit included in the printer 204 exceeds a predetermined temperature, the printer 204 notifies the controller unit 201 of the error code indicating a high temperature error. For example, if data writing to the ROM 314 in the scanner controller unit 203 fails, the scanner 205 notifies the controller unit 201 of the error code indicating a write error.

The alarm code is identification information indicating the type of a phenomenon which may possibly cause an error in the future although no error has occurred in the multifunction peripheral 120. Like the error code, the alarm code is notified as a string of characters and numbers, such as A12-3456. For example, when the toner remaining amount is less than a threshold value and it is determined that toner will soon run out, an alarm code indicating a no-toner alert is notified to the controller unit 201.

The state management module 408 records information about the notified error and alarm codes in a state management database 409 (hereinafter referred to as a "state management DB"). The state management module 408 also records the unit code indicating a result of diagnosis performed by a diagnosis module 406, 415, or 425 (described below) in the state management DB 409. According to the present exemplary embodiment, the state management module 408 performs control to store, in the state management DB 409, the error code indicating the type of an error and a unit code indicating the cause of the error in an associated way. The unit code will be described below with reference to FIG. 5.

A detection module 404 detects an error occurring in the controller unit 201. The detection module 404 detects an abnormal condition in the controller unit 201, for example, by using a sensor.

An identification module 405 identifies the type of the error detected by the detection module 404. The identification module 405 distinguishes the type of the error occurring and outputs error information (error code).

If an error occurs in the controller unit 201, the diagnosis module 406 performs diagnostic processing corresponding to the error type identified by the identification module 405. Each error type and diagnostic processing information indicating diagnostic processing to be performed when the error type occurs are prestored in the ROM 302 or the HDD 304. If an error occurs, the diagnosis module 406 determines the content of diagnostic processing to be performed, based on the error code and the diagnostic processing information for the error. The diagnosis module 406 performs diagnostic processing to identify the component where the error has occurred and a measure (solution) for resolving the error. Then, the diagnosis module 406 generates a unit code based on a diagnostic result. The unit code will be described below with reference to FIG. 5. The control module 401 controls the operation unit control module 402 to display the generated unit code on the display unit of the operation unit 206.

<Configuration of Firmware 410>

The firmware 410 generally controls each configuration of the printer controller unit 202. A control module 411 performs print processing according to a print instruction received from the controller unit 201 via an I/F control module 412. If an error occurs during print processing, the control module 411 requests the diagnosis module 415 to perform diagnostic processing.

A detection module 413 (first detection unit) detects an error occurring in the printer controller unit 202 and the printer 204. The detection module 413 detects an abnormal condition in the printer controller unit 202 and the printer 204, for example, by using a sensor.

An identification module 414 (first identification unit) identifies the type of the error detected by the detection module 413. The identification module 414 distinguishes the type of the error that has occurred and outputs error information (error code).

If an error occurs in the printer controller unit 202, the diagnosis module 415 performs diagnostic processing corresponding to the type of the error that has occurred. Each error type and diagnostic processing information indicating diagnostic processing to be performed when the type of error occurs are prestored in the ROM 311. If an error occurs, the diagnosis module 415 determines the content of diagnostic processing to be performed, based on the error code and the diagnostic processing information for the error. The diagnosis module 415 performs diagnostic processing to identify the location where the error has occurred and a measure (solution) for resolving the error. Then, the diagnosis module 415 generates a unit code based on a diagnostic result. The generated unit code is notified to the control module 411 and the I/F control module 412 and is also notified to the control module 401 via the I/F control module 407. The control module 401 controls the operation unit control module 402 to display the error code and the unit code on the display unit of the operation unit 206.

<Configuration of Firmware 420>

The firmware 420 generally controls each configuration of the scanner controller unit 203. A control module 421 performs scan processing according to a scan instruction received via an I/F control module 422. If an error occurs in a scan processing, the control module 421 requests the diagnosis module 425 to perform diagnostic processing.

A detection module 423 (second detection unit) detects an error occurring in the scanner controller unit 203 and the scanner 205. The detection module 423 detects an abnormal condition in the scanner controller unit 203 and the scanner 205, for example, by using a sensor.

An identification module 424 (second identification unit) identifies the type of the error detected by the detection module 423. The identification module 424 distinguishes the type of the error that has occurred and outputs error information (error code).

If an error occurs in the scanner controller unit 203, the diagnosis module 425 performs diagnostic processing corresponding to the type of the error that has occurred. Each type of error and diagnostic processing information indicating diagnostic processing to be performed when the type of error occurs are prestored in the ROM 314. If an error occurs, the diagnosis module 425 determines the content of diagnostic processing to be performed, based on the error code and the diagnostic processing information for the error. The diagnosis module 425 performs diagnostic processing to identify the location (component) where the error has occurred and a measure (solution) for resolving the error. Then, the diagnosis module 425 generates a unit code based on a diagnostic result. The generated unit code is notified to the control module 421 and the I/F control module 422 and is also notified to the control module 401 via the I/F control module 407. The control module 401 controls the operation unit control module 402 to display the generated unit code on the display unit of the operation unit 206.

Although, in the above-described example according to the present exemplary embodiment, each of the diagnosis modules 406, 415, and 425 generates and outputs a unit code, the configuration is not limited thereto. For example, instead that each diagnosis module generates a unit code, a unit code generation module (not illustrated) may be provided in the firmware 400 to integrally generate a unit code. The diagnosis modules 406, 415, and 425 notify the unit code generation module of a diagnostic result. The unit code generation module may generate a unit code based on the notified diagnostic result and outputs the unit code.

<Description of Unit Code>

Figure 5:
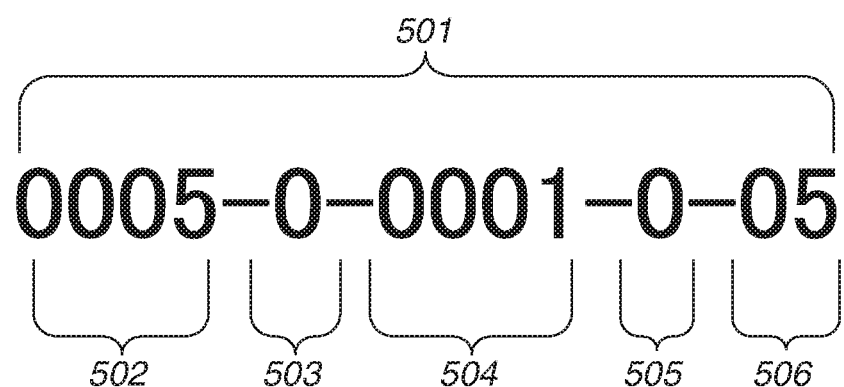
FIG. 5 illustrates an example of a unit code according to one embodiment.

A unit code will be described below with reference to FIG. 5. A unit code refers to identification information indicating the location (component) identified through the execution of diagnostic processing and a measure (solution) for resolving an error. An error code is error information indicating the type of an error that has occurred while a unit code is diagnostic information indicating the cause of the error and a method for resolving the error.

For example, a unit code 501 is represented by a string of numbers and characters. The unit code 501 includes unit identification information 502, subunit identification information 503, component identification information 504, measure identification information 505, and occurrence division information 506. A character "U" which indicates that the code is a unit code may be appended to the head or end of the unit code 501.

The unit identification information 502 indicates the unit composed of a component group including the component that caused the error in the multifunction peripheral 120. A unit and a subunit (described below) mean the unit of component replacement. More specifically, if an error occurs in a certain component of a plurality of components included in a unit, the whole unit including the component is replaced. Alternatively, if an error occurs in a certain component of a plurality of components included in a subunit (described below), the whole subunit including the component is replaced. For specific components, however, component replacement may not be performed on a unit basis. Specifically, if an error occurs in a specific component, only the component may be replaced.

Examples of units include the controller unit 201, the HDD 304, and fixing units, drum units, development units, an intermediate transfer belt (ITB) unit, and toner cartridges in the printer 204.

The subunit identification information 503 indicates the subunit including the component that has caused the error out of one or a plurality of subunits configuring the unit indicated by the unit identification information 502. For example, in a case where the unit identification information 502 indicates a drum unit as the unit that has caused the error, the subunit identification information 503 indicates one of the cyan, magenta, yellow, and black drum units as the unit that has caused the error.

In this way, the unit code 501 according to the present exemplary embodiment includes the unit identification information 502 indicating a unit as a component group including the component that has caused the error. The unit code 501 further includes the subunit identification information 503 indicating the subunit including the component that has caused the error out of one or a plurality of subunits configuring the component group. Display of the subunit identification information 503 is not mandatory, i.e., the subunit identification information 503 may not be displayed.

The component identification information 504 indicates the component that has caused the error among a plurality of components included in the unit indicated by the unit identification information 502. For example, in a case where the unit identification information 502 indicates the main drive unit as the unit that has caused the error, the subunit identification information 503 can indicate one of the following as the unit that has caused the error: BK drum motor, CL drum motor, development motor (Yellow), development motor (Magenta), development motor (Cyan), and development motor (Black).

The subunit identification information 503 indicates a subunit as a unit of component replacement. On the other hand, the component identification information 504 indicates a specific component regardless of whether the component is a unit of replacement.

The measure identification information 505 is information indicating a required measure for the unit or component that has caused the error. The measure identification information 505 indicates a solution for resolving the error that has occurred. Examples of required solutions include "Replacement Required", "Confirmation Required Since Possibility of Failure Is High", "Cleaning Required", and "Adjustment Required". With the measure identification information 505, a service engineer or a user can know whether the component determined to be defective needs to be replaced or the diagnostic result only indicating that the component may possibly be defective.

In this way, the control module 401 controls the operation unit control module 402 to display diagnostic information, more specifically, information including the component identified by the diagnosis module 415 and an identified solution, on the display unit.

The occurrence division information 506 indicates an occurrence division as information for identifying the mounting location of the unit that has caused the error. For example, this information indicates whether the unit that has caused the error is a unit configuring the main body of the multifunction peripheral 120 or a unit of an optional apparatus of the multifunction peripherals 120, such as a finisher, puncher, or stacker. An optional apparatus refers to an apparatus detachably attached to the multifunction peripheral 120. The multifunction peripheral 120 can operate without optional apparatuses. Optional apparatuses include apparatuses for performing postprocessing on a printed product, such as a finisher, puncher, and stacker. Attaching an optional apparatus to the multifunction peripheral 120 enables extending the functions of the multifunction peripheral 120.

<Processing Flow for Displaying Unit Code at Occurrence of Printing Error>

Processing for displaying the unit code in the multifunction peripheral 120 will be described below with reference to FIG. 6. FIG. 6 illustrates an example of failure diagnosis to be performed if an error occurs in the printer 204 while the multifunction peripheral 120 is performing print processing. The procedure in this flowchart is implemented when the CPU 301 executes a program stored in at least one of storage units (the RAM 303, the ROM 302, and the HDD 304) of the controller unit 201.

In step S601, the control module 401 receives a print instruction from the operation unit I/F 306 and instructs the image processing module 403 to generate image data.

In step S602, the image processing module 403 performs processing for converting the image data into image data of a format interpretable by the printer 204, based on image data written in a Page Description Language (PDL).

The control module 401 requests the I/F control module 407 to perform processing for printing the print data generated by the image processing module 403. The I/F control module 407 requests the printer controller unit 202 to perform processing for printing an image. In step S603, the printer controller unit 202 controls the printer 204 to perform the requested print processing. Printing control processing by the printer controller unit 202 will be described below with reference to FIG. 8.

The control module 401 receives, from the printer controller unit 202, normal end information indicating that the print processing is normally completed or error information indicating that the print processing has failed as a processing result. The error information is notified in an error code format. The error code is information indicating the type of an error that has occurred.

In step S604, based on the received information, the control module 401 determines whether an error has occurred in print processing. According to the present exemplary embodiment, when the control module 401 receives the normal end information, the control module 401 determines that the print processing is normally completed. On the other hand, when the control module 401 receives an error code as the error information, the control module 401 determines that an error has occurred in the print processing.

Alternatively, processing for notifying the normal end information from the printer controller unit 202 may be omitted. The control module 401 may determine that the print processing is normally completed when the error information is not notified within a predetermined time period.

When the control module 401 determines that the print processing is normally completed (NO in step S604), the control module 401 ends the processing without displaying an error code or a unit code.

On the other hand, when the control module 401 determines that an error has occurred in the print processing (YES in step S604), the processing proceeds to step S605. In step S605, the control module 401 determines whether the unit code corresponding to the error has already been acquired.

According to the present exemplary embodiment, a unit code is generated by the diagnosis module 415 in the printer controller unit 202 and then notified to the control module 401 in the controller unit 201. If an error occurs, the diagnosis module 415 performs diagnostic processing for identifying the component that has caused the error and a measure for solving the error and outputs the unit code 501 to the control module 401 as a diagnostic result.

Each time a component that has caused the error is detected, one unit code is output. For example, when the diagnosis module 415 makes a diagnosis that a plurality of components has failed (and needs to be replaced) as a result of diagnosis, a plurality of unit codes 501 is output to the control module 401. According to the present exemplary embodiment, also when the diagnosis module 415 makes a diagnosis that a plurality of components may possibly be defective as a result of diagnosis, a plurality of the unit codes 501 is output to the control module 401. A user or a service engineer can determine whether a component has failed (and needs to be replaced) or a component may possibly be defective by checking the measure identification information 505 of the unit code.

The diagnosis module 415 may notify the control module 401 of information indicating that the diagnosis module 415 is currently performing diagnostic processing.

In addition, instead of automatically starting diagnostic processing when an error occurs, the diagnosis module 415 may start diagnostic processing when the control module 401 that has received error information instructs the diagnosis module 415 to the start diagnostic processing.

Returning to the flowchart illustrated in FIG. 6, when the control module 401 determines that the unit code corresponding to the error occurred is not acquired (NO in step S605), the processing repeats step S605. When the unit code is not acquired after a predetermined time period has elapsed since occurrence of an error is detected, the control module 401 may generate a unit code indicating that diagnosis is not possible or diagnosis has failed and display the unit code on the operation unit 206. Also, when a unit code is not acquired even after the processing in step S605 is repeated a predetermined number of times, the control module 401 may display, on the operation unit 206, the unit code indicating that diagnosis is not possible or diagnosis has failed.

On the other hand, when the unit code corresponding to the error occurred is acquired (YES in step S605), the processing proceeds to step S606. In step S606, the control module 401 controls the state management module 408 to record the following information in the state management DB 409. Specifically, according to an instruction of the control module 401, the state management DB 409 records the date, the device serial number of the multifunction peripheral 120, the error code of the error that has occurred, and the acquired unit code in an associated way. Recording the error code and the unit code makes it possible to analyze the status and cause of the error afterward, notify the server 130 of the recorded content, and request the service center to take a measure for resolving the error.

Figure 7A:
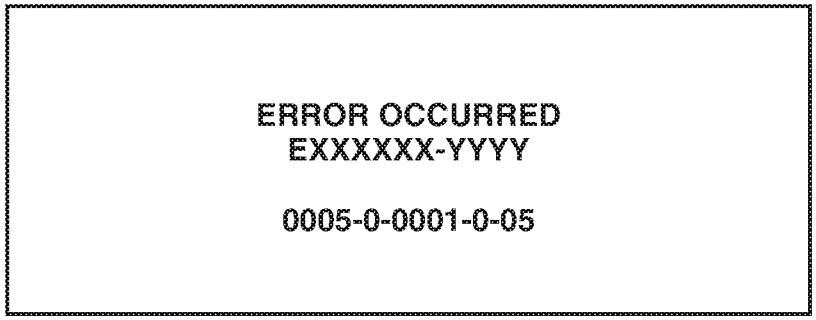
FIGS. 7A, 7B, and 7C illustrate display examples of an error code and a unit code according to one embodiment.

In step S607, the control module 401 controls the operation unit control module 402 to display the acquired error code and unit code on the display unit of the operation unit 206. An example of an error code and a unit code displayed on the display unit is illustrated in FIG. 7A.

When the number of unit codes to be displayed is equal to or larger than a threshold value, in step S607, the control module 401 may display, on the operation unit, a unit code indicating that the number of unit codes to be displayed is equal to or larger than the predetermined number or a unit code indicating that the cause of the error cannot be identified. The unit code indicating that the number of unit codes to be displayed is equal to or larger than the threshold value (predetermined number) may be, for example, a specific character string "XXXX" which indicates the unit identification information 502.

Figure 7B:
Figure 7C:
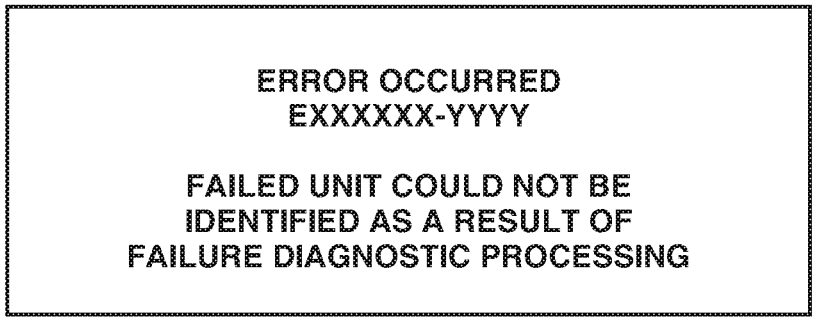

The diagnosis module 415 generates the unit code indicating that the number of unit codes to be displayed is equal to or larger than the predetermined number and notifies the control module 401 of the generated unit code. The control module 401 controls the operation unit control module 402 to display a message corresponding to the received unit code. When the control module 401 acquires the unit code indicating that the number of unit codes to be displayed is equal to or larger than the predetermined number, the operation unit control module 402 may display the unit code on the display unit as it is. Alternatively, as illustrated in FIG. 7C, the control module 401 may analyze the unit code, generate a message indicating that the unit that has caused the error cannot be identified, and display the generated message on the display unit. Alternatively, the control module 401 may display, on the display unit, a message indicating that failures of a plurality of units are detected as the cause of the occurrence of the error.

Alternatively, when the control module 401 acquires, from the diagnosis module 415, a predetermined number or more of unit codes for one error, the control module 401 may generate a unit code indicating that the unit that has caused the error cannot be identified and display the unit code on the display unit.

As described above, if an error occurs during print processing, the control module 401 can acquire the unit code indicating the unit that has caused the error and display the unit code on the display unit.

If the acquired unit code is stored in the state management DB 409, the service engineer can confirm the unit code afterward, not immediately after an error has occurred, by operating the multifunction peripheral 120 in the service mode. The service mode refers to a mode for displaying a setting screen which can be operated only by a user having predetermined authority.

For example, under the control of the control module 401, it can be determined whether the user has predetermined authority. When the control module 401 determines that the user has predetermined authority, the multifunction peripheral 120 can be operated in the service mode. When the multifunction peripheral 120 is operating in the service mode, the multifunction peripheral 120 can display the error code and the unit code stored in the state management DB 409, on the display unit.

For example, if authentication using the user identification information and the password combination is successful, the control module 401 can determine that the user has predetermined authority. Alternatively, when a predetermined operation known only by the service engineer is performed on the multifunction peripheral 120, the control module 401 determines that the user has predetermined authority.

In the service mode, the service engineer can adjust the settings of the multifunction peripheral 120 and confirm the operation history thereof. Since the error code and the unit code are stored in an associated way as described above, the service engineer can confirm the operation history in which the type and the cause of the error occurred are associated with each other.

Alternatively, when a function of periodically transmitting the operation history (log) of the multifunction peripheral 120 to the server 130 is enabled, the stored unit code may be transmitted to the server 130. The operator of the server 130 can manage the multifunction peripheral 120 by confirming the operation history transmitted to the server 130. The unit code may be transmitted to the server 130 at the same timing as the periodical log transmission or at the timing of an error occurrence.

Alternatively, regardless of whether a function of managing the multifunction peripheral 120 by the server 130 is enabled or disabled, the multifunction peripheral 120 may transmit the unit code to the server 130 if an error occurs. In addition to the unit code, the multifunction peripheral 120 may transmit, to the server 130 via a network, the error code stored in the state management DB 409 in association with the unit code.

Although, in the example illustrated in FIG. 6, an error occurs during print processing, the control module 401 can similarly display a unit code on the display unit if an error occurs during scan processing. More specifically, the diagnosis module 425 included in the firmware 420 of the scanner controller unit 203 performs diagnostic processing and outputs a diagnostic result as a unit code to the control module 401. The control module 401 can perform processing in steps S605 to S610 to perform unit code display control.

<Print Processing Flow>

A diagnostic processing flow in the printer controller unit 202 will be described below with reference to FIG. 8. Steps of the flowchart illustrated in FIG. 8 are stored in either one of the storage units (the RAM 312 and the ROM 311) and executed by the CPU 310 in the printer controller unit 202.

In step S801, the printer controller unit 202 receives an instruction for performing print processing from the controller unit 201. In step S802, the control module 411 requests the printer 204 to perform print processing.

In a case where an error occurs in print processing (YES in step S803), the processing proceeds to step S804. In step S804, the control module 411 outputs, to the controller unit 201, the error information (error code) corresponding to the error having occurred. On the other hand, when print processing is normally performed (NO in step S803), the control module 411 ends print processing.

In step S805, the control module 411 requests the diagnosis module 415 to perform diagnostic processing. The diagnostic processing will be described in detail below with reference to FIG. 9.

When the diagnostic processing is completed, then in step S806, the control module 411 notifies the controller unit 201 of a diagnostic result via the I/F control module 407 and ends the flow of the image print processing.

Although, in the above-described example, diagnostic processing is performed if an error occurs during execution of print processing, the configuration is not limited thereto. If an error occurs while the scanner 205 and the scanner controller unit 203 are performing scan processing, the diagnosis module 425 also starts diagnostic processing. Then, the scanner controller unit 203 outputs the unit code corresponding to a diagnostic result to the controller unit 201.

<Diagnostic Processing Flow>

Figure 9:
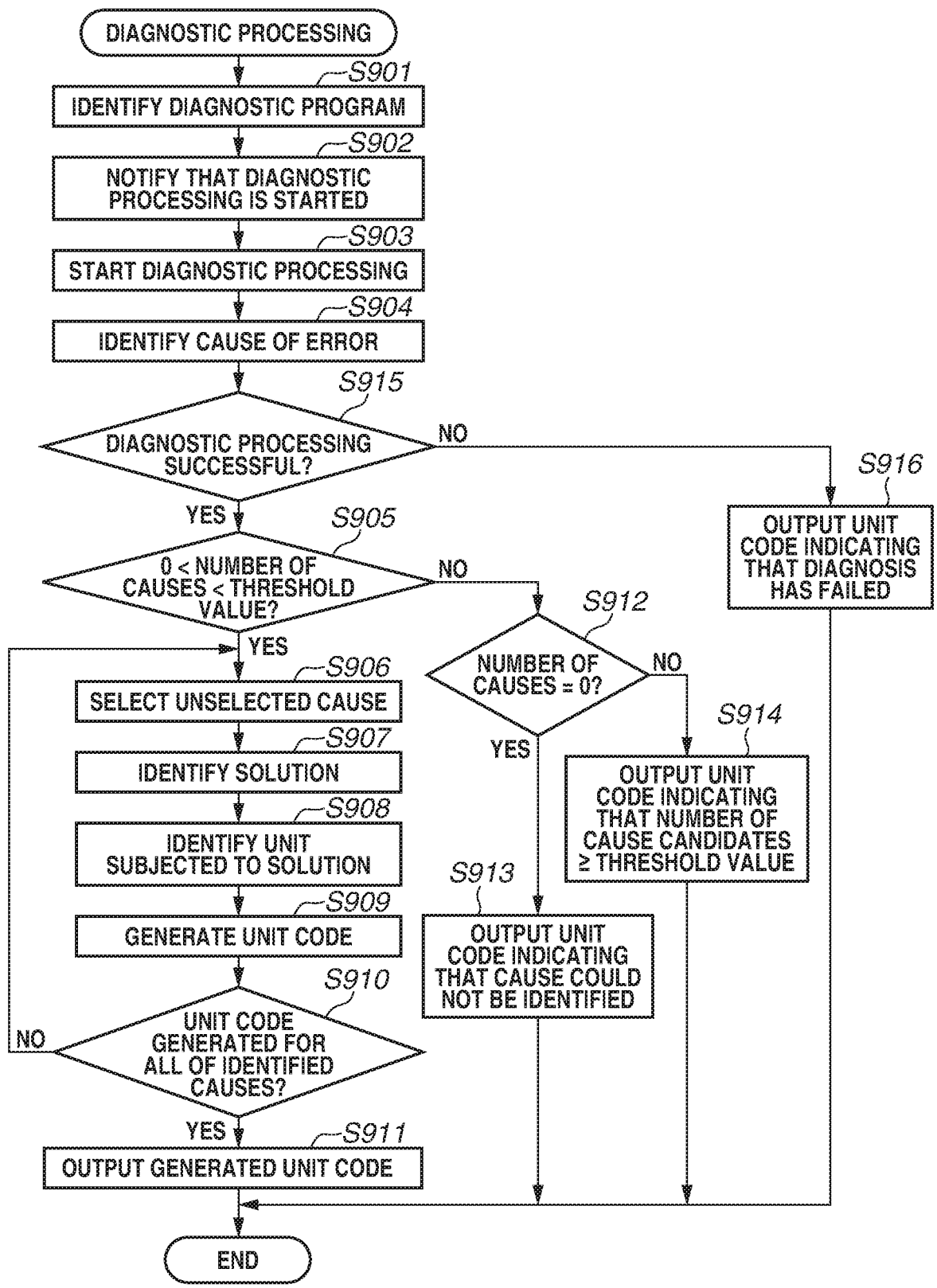
FIG. 9 is a flowchart illustrating diagnostic processing according to the first exemplary embodiment.

A diagnostic processing flow by the diagnosis module 415 will be described below with reference to FIG. 9. Steps of the flowchart illustrated in FIG. 9 are stored in either one of the storage units (the RAM 312 and the ROM 311) and executed by the CPU 310 in the printer controller unit 202.

When diagnostic processing is started in step S805, then in step S901, the diagnosis module 415 identifies a diagnostic program associated with the error code output in step S804. The diagnostic program to be executed (content of diagnostic processing) can be prestored, for example, in the ROM 311 for each error code.

In step S902, the diagnosis module 415 notifies the controller unit 201 that diagnostic processing has been started.

In step S903, the diagnosis module 415 starts diagnostic processing by using the diagnostic program identified in step S901. There may be a plurality of candidate causes of an error even if the same single error code is output. The diagnostic processing in step S903 is processing for identifying a phenomenon or component that has caused the error from the plurality of candidate causes.

An error code refers to identification information associated with a phenomenon that has occurred. For example, if a power source error occurs in the circuit substrate of the scanner controller unit 203, the error code indicating the power source error is notified to the controller unit 201.

There is a plurality of possible causes of a power source error, such as disconnection and software problems. In step S904, the diagnosis module 415 identifies the actual cause from a plurality of candidate causes by performing a continuity test which needs to be performed if a write error occurs.

The diagnosis module 415 does not necessarily need to narrow down the causes of the error to one. For example, if the error is caused by complex factors, a plurality of causes is identified. As a result of diagnosis, the diagnosis module 415 can detect a plurality of candidate causes which may possibly contribute to the occurrence of the error. The present exemplary embodiment will be described below centering on an example where one unit code corresponds to one error cause.

In step S915, the diagnosis module 415 determines whether diagnostic processing (identification of the cause of an error) is normally (successfully) completed. Examples of cases where diagnostic processing fails include a case where diagnostic processing is interrupted because the main body cover of the multifunction peripheral 120 is opened during execution of diagnostic processing. During diagnostic processing, a warning message for prohibiting the user from opening or closing the main body cover may be displayed on the display unit.

When the diagnosis module 415 determines that processing for identifying the cause has failed (NO in step S915), the processing proceeds to step S916. In step S916, the diagnosis module 415 outputs a unit code indicating that the diagnostic processing has failed and ends the processing. The unit code indicating that diagnostic processing has failed may be represented by a specific character string including, for example, "XXXX" as the unit identification information 502 and "C" as the measure identification information 505.

On the other hand, when the diagnosis module 415 determines that the processing for identifying the cause is successful (YES in step S915), the processing proceeds to step S905. In step S905, the diagnosis module 415 determines whether the number of identified causes is within a predetermined range. The processing in step S905 is equivalent to processing for determining whether the number of unit codes to be displayed is with a predetermined range. According to the present exemplary embodiment, the number of items within a predetermined range refers to a number larger than 0 and less than a threshold value. Although, in the example according to the present exemplary embodiment, one unit code corresponds to one cause, the configuration is not limited thereto. When a plurality of causes is detected because of errors in components in the same unit, one unit code may be displayed for the plurality of causes.

When the diagnosis module 415 determines that the number of causes is within the predetermined range (YES in step S905), the processing proceeds to step S906. In step S906, the diagnosis module 415 selects an unselected cause among one or a plurality of identified causes.

In step S907, the diagnosis module 415 determines a measure for the selected cause to resolve the error. Examples of a measure include "Replacement Required", "Cleaning Required", and "Adjustment Required". The identified measure is reflected to the measure identification information 505 in the unit code illustrated in FIG. 5.

In step S908, the diagnosis module 415 identifies the units subjected to the above-described measure. Specifically, the diagnosis module 415 identifies units requiring replacement, units requiring cleaning, or units requiring adjustment. The identified unit is reflected to the unit identification information 502, the subunit identification information 503, and the component identification information 504 illustrated in FIG. 5.

In step S909, the diagnosis module 415 generates a unit code based on the result of the diagnosis in steps S903 to S908.

In step S910, the diagnosis module 415 determines whether a unit code has been generated for all of the one or the plurality of causes identified in step S904.

When there is a cause for which a unit code is not generated, the diagnosis module 415 repeats the processing in step S906 and subsequent steps. On the other hand, when a unit code has been generated for all of the causes (YES in step S910), the processing proceeds to step S911. In step S911, the diagnosis module 415 outputs the generated unit code to the control module 411 and ends the processing.

On the other hand, when the diagnosis module 415 determines that the number of causes is out of the predetermined range (NO in step S905), the processing proceeds to step S912. In step S912, the diagnosis module 415 determines whether the number of identified causes is zero (no cause was identified).

When the number of identified causes is zero (i.e., when no cause was identified) (YES in step S912), the processing proceeds to step S913. In step S913, the diagnosis module 415 outputs a unit code indicating that no cause was identified. Examples of cases where a cause cannot be identified include a case where the unit that has caused the error is not a diagnosis target (for example, a finisher). The unit code indicating that the unit that has caused an error cannot be identified may be represented by a specific character string including, for example, "XXXX" as the unit identification information 502 and "A" as the measure identification information 505.

On the other hand, when the number of identified causes is not zero (NO in step S912), the processing proceeds to step S914. In step S914, the diagnosis module 415 outputs the unit code indicating that the number of candidate causes is equal to or larger than a threshold value. More specifically, in a case where the number of pieces of diagnostic information to be displayed is equal to or larger than a predetermined number, the diagnosis module 415 displays, instead of a plurality of pieces of diagnostic information to be displayed, diagnostic information indicating that the number of pieces of diagnostic information is equal to or larger than the predetermined number. The unit code indicating that the number of pieces of diagnostic information is equal to or larger than a predetermined number may be represented by a specific character string including, for example, "XXXX" as the unit identification information 502 and "B" as the measure identification information 505. In a case where the number of candidate causes is equal to or larger than a threshold value, outputting a unit code for all of the identified candidate causes may not possibly contribute to the identification of the cause of a failure by the user or service engineer. Therefore, in such a case, the diagnosis module 415 outputs a unit code indicating that the cause could not be identified. Alternatively, in a case where the number of unit codes to be displayed is equal to or larger than a predetermined number, the diagnosis module 415 may display an error code and may not display a unit code on the display unit, as illustrated in FIG. 7B. However, the configuration is not limited thereto. When the number identified causes is equal to or larger than a threshold value, the diagnosis module 415 may generate and output a unit code corresponding to each individual cause.

The diagnosis module 415 can output a unit code as described above. Although, in the above-described example according to the present exemplary embodiment, the printer controller unit 202 performs diagnostic processing, the configuration is not limited thereto. Also, in a case where an error occurs in the scanner controller unit 203, the scanner 205, or the controller unit 201, the diagnosis module of each unit can perform similar diagnostic processing.

According to the present exemplary embodiment, if an error occurs in the multifunction peripheral 120, the multifunction peripheral 120 itself performs failure diagnosis to identify a defective hardware location where the error has occurred. Then, the multifunction peripheral 120 presents the user with a solution for resolving the error corresponding to the defective location.

Using the conventional technique, displaying only error information (error code) enables identification of the content of an error that has occurred but cannot identify the cause of the error, so that the service engineer needs to take time and effort to manually perform diagnosis to identify the cause of the error.

According to the above-described configuration, the multifunction peripheral 120 in which an error has occurred performs a failure diagnostic test itself, allowing the service engineer to omit time and effort to manually perform diagnosis.

Since the multifunction peripheral 120 itself performs diagnosis, more detailed diagnosis can be performed in comparison with a case where an apparatus other than multifunction peripheral 120 performs diagnosis by acquiring information from the multifunction peripheral 120. This makes it possible to output a diagnostic result which is highly likely to be the actual cause of a failure.

In the conventional technique, when a service engineer was notified of occurrence of a failure, the service engineer is dispatched to the site and first performed failure diagnosis processing to identify a component to be replaced based on a diagnostic result. In some cases, since the service engineer needs to go back to the service center to obtain necessary components and then return to the site again, the number of times the service engineer is dispatched increases and much time is consumed to resolve a failure state. To reduce the number of times the service engineer is dispatched to the site, the service engineer needs to prepare many kinds of replacement components before going to a site.

According to the present exemplary embodiment, as described above, a unit code can be stored in the state management DB 409 and transmitted to the server 130. Since the unit code includes information about the unit to be replaced, the service engineer can prepare components required for resolving an error before going to a site. This makes it possible to reduce the number of times the service engineer is dispatched to the site.

A second exemplary embodiment will be described below. The present exemplary embodiment will be described below centering on an example case where there is a unit code having one-to-one correspondence to an error that has occurred.

The hardware and firmware configurations are similar to those according to the first exemplary embodiment, and redundant descriptions thereof will be omitted. The processing flow performed by the controller unit 201 is similar to that according to the first exemplary embodiment described above with reference to FIG. 6, and redundant descriptions thereof will be omitted. The print control processing performed by the printer controller unit 202 is similar to that according to the first exemplary embodiment described above with reference to FIG. 8, and redundant descriptions thereof will be omitted.

Figure 10:
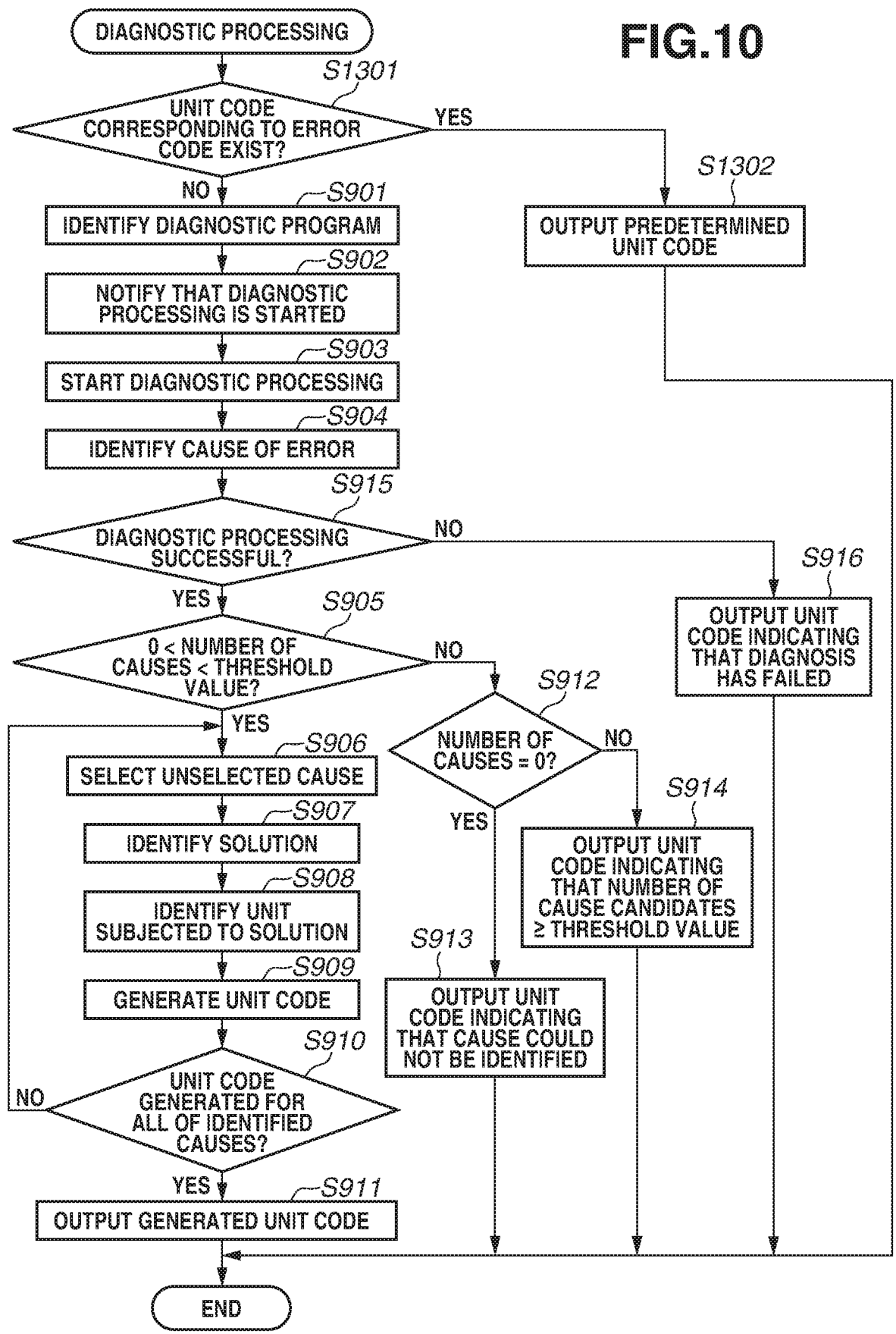
FIG. 10 is a flowchart illustrating diagnostic processing according to a second exemplary embodiment.

A diagnostic processing flow performed by the diagnosis module 415 according to the present exemplary embodiment will be described below with reference to FIG. 10. Steps of the flowchart illustrated in FIG. 10 are stored in either one of the storage units (the RAM 312 and the ROM 311) and executed by the CPU 310 in the printer controller unit 202.

When the control module 411 instructs the diagnosis module 415 to perform diagnostic processing, then in step S1301, the diagnosis module 415 determines whether there is a unit code having one-to-one correspondence to the error code corresponding to the error that has occurred. Examples of cases where there is a unit code having one-to-one correspondence to an error code include a case where the error code that has occurred is a predetermined error code, and a location where the error has occurred and a solution for the error can be identified when the error has occurred. In association with the predetermined error code, the ROM 311 or the HDD 304 stores a unit code indicating a predetermined error location and a predetermined solution.

The unit code having one-to-one correspondence to the predetermined error code is predetermined and hard-coded in a program. Alternatively, a correspondence table for these codes is internally stored.

When the diagnosis module 415 determines that there is no unit code associated with the error code occurred (NO in step S1301), the processing proceeds to step S901. The diagnosis module 415 performs processing in steps S901 to S914.

On the other hand, when the diagnosis module 415 determines that there is a predetermined unit code associated with the error code that has occurred (YES in step S1301), the processing proceeds to step S1302. In step S1302, the diagnosis module 415 outputs the unit code and ends the processing.

When the error that has occurred is not of the predetermined type of error, the diagnosis module 415 performs the diagnostic processing associated with the type of error that has occurred to identify the component that has caused the error. In addition, when the error that has occurred is of the predetermined type of error, the diagnosis module 415 does not perform diagnostic processing but identifies information indicating the predetermined component associated with the predetermined type of error as the component that has caused the error.

According to the present exemplary embodiment, in a case where a unit code can be uniquely identified for an error code that has occurred, a unit code can be generated without performing diagnostic processing, such as a continuity test. As a result, it becomes possible to output a unit code without performing diagnostic processing which may possibly consume time.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-080120, filed Apr. 18, 2018, which is hereby incorporated by reference herein in its entirety.

What is claimed is:

1. An information processing apparatus including a plurality of components, comprising:
sensors;
at least one memory storing instructions; and
at least one processor executing the instructions causing the information processing apparatus to:
identify a type of an error detected by any one of the sensors;
acquire a result of diagnostic processing corresponding to the identified type of the error; and
control output of error information indicating the identified type of the error, and diagnostic information about one or more components corresponding to the result of the diagnostic processing,
wherein, based on comparison between a number of components corresponding to the result of the diagnostic processing and a threshold value, diagnostic information indicating information for identifying a result of the comparison is output, and
wherein in a case where no component is identified as the result of the diagnostic processing, diagnostic information indicating that no component is identified is output.

2. The information processing apparatus according to claim 1, wherein the diagnostic information further includes identification information for identifying whether a component that has caused the error is a component included in the main body of the information processing apparatus or a component included in an optional apparatus detachably attached to the information processing apparatus.

3. The information processing apparatus according to claim 1,
wherein a result of the diagnostic processing further includes a solution for resolving the error that has occurred, and
wherein a component and the solution corresponding to the result of the diagnostic processing are output as the diagnostic information.

4. The information processing apparatus according to claim 3, wherein the solution includes at least one of information indicating that replacement is required, information indicating that there is a high possibility of a failure, information indicating that cleaning is required, and information indicating that adjustment is required.

5. The information processing apparatus according to claim 1, wherein the diagnostic information includes unit identification information indicating a unit as a component group including a component that has caused the error, and subunit identification information indicating a subunit including the component that has caused the error among one or a plurality of subunits included in the component group.

6. The information processing apparatus according to claim 1,
wherein the instructions further cause the information processing apparatus to:
store the error information indicating the identified type of the error and the diagnostic information in an associated way; and
determine whether a user has predetermined authority, and
wherein, in a case where the user is determined to have the predetermined authority, output of the error information and the diagnostic information stored are controlled.

7. The information processing apparatus according to claim 1, wherein the error information and the diagnostic information are output to a server apparatus via a network.

8. The information processing apparatus according to claim 1,
wherein, in a case where the identified type of the error is not a predetermined type, diagnostic processing corresponding to the identified type of the error is performed, and
wherein, in a case where the identified type of the error is the predetermined type, diagnostic processing corresponding to the identified type of the error is not performed, and information about a predetermined component associated with the predetermined type of the error is output as the diagnostic information.

9. The information processing apparatus according to claim 1, further comprising a printer, wherein the sensors include a sensor for detecting an error related to processing of the printer.

10. The information processing apparatus according to claim 1, further comprising a scanner,
wherein the sensors include a sensor for detecting an error related to processing of the scanner.

11. A method for controlling an information processing apparatus including sensors and a plurality of components, the method comprising:
identifying a type of an error detected by any one et the sensors;
acquiring a result of diagnostic processing corresponding to the identified type of the error; and
controlling output of error information indicating the identified type of the error, and diagnostic information about one or more components corresponding to the result of the diagnostic processing,
wherein, based on comparison between a number of components corresponding to the result of the diagnostic processing and a threshold value, diagnostic information indicating information for identifying a result of the comparison is output, and
wherein in a case where no component is identified as the result of the diagnostic processing, diagnostic information indicating that no component is identified is output.

12. A non-transitory computer-readable storage medium on which is stored a computer program for making a computer execute a method for controlling an information processing apparatus including sensors and a plurality of components, the method comprising:
identifying a type of an error detected by any one of the sensors;
acquiring a result of diagnostic processing corresponding to the identified type of the error; and
controlling output of error information indicating the identified type of the error, and diagnostic information about one or more components corresponding to the result of the diagnostic processing,
wherein, based on comparison between a number of components corresponding to the result of the diagnostic processing and a threshold value, diagnostic information indicating information for identifying a result of the comparison is output, and
wherein in a case where no component is identified as the result of the diagnostic processing, diagnostic information indicating that no component is identified is output.

* * * * *